Nov. 16, 1948. J. E. MOSS 2,453,722

TOOLHOLDER

Filed May 26, 1944

INVENTOR.
Jacob Edward Moss
BY
C. B. Weed
Attorney

Patented Nov. 16, 1948

2,453,722

UNITED STATES PATENT OFFICE 2,453,722

TOOLHOLDER

Jacob E. Moss, Detroit, Mich., assignor to The National Acme Company, Cleveland, Ohio, a corporation of Ohio Application May 26, 1944, Serial No. 537,434

3 Claims. (Cl. 29—105)

This invention relates to metal working machines or the like and, more particularly, to an improved tool holder for such machines and has for its principal object the provision of such tool holder which will automatically center itself relative to a work piece.

Heretofore, it has been necessary to provide or design a separate tool holder for various tools such as shaving, burnishing, knurling and like tools. Therefore, a further object of the present invention is the provision of an improved tool holder capable of interchangeably holding various tools of the circular or roller type, for working on the outside diameter of a work piece and which will finish the piece to very accurate limits and without the necessity of changing the holder for each type of tool.

Another object of the present invention is the provision of a tool holder to carry different types of tools interchangeably and in which such tools may be adjusted toward and from each other to permit them to operate upon work pieces of varying diameters.

A still further object of the present invention is the provision of such a tool holder which will be simple in construction, efficient in use and inexpensive to manufacture and which will permit operations upon various types of materials such as steel, brass, etc.

In the drawings accompanying and forming a part of this specification, Fig. 1 is a face view of this improved tool holder illustrating the tools in position to operate upon a work piece.

Similar characters of reference indicate corresponding parts in the several views.

Figure 1:
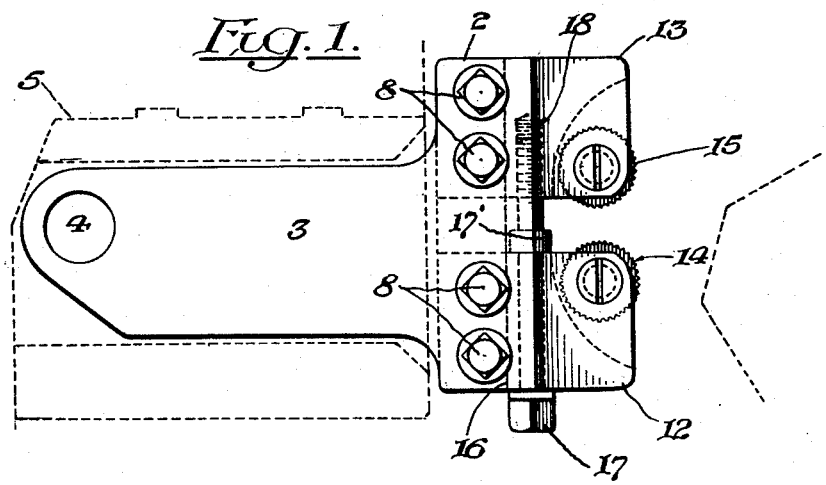
Figure 2:
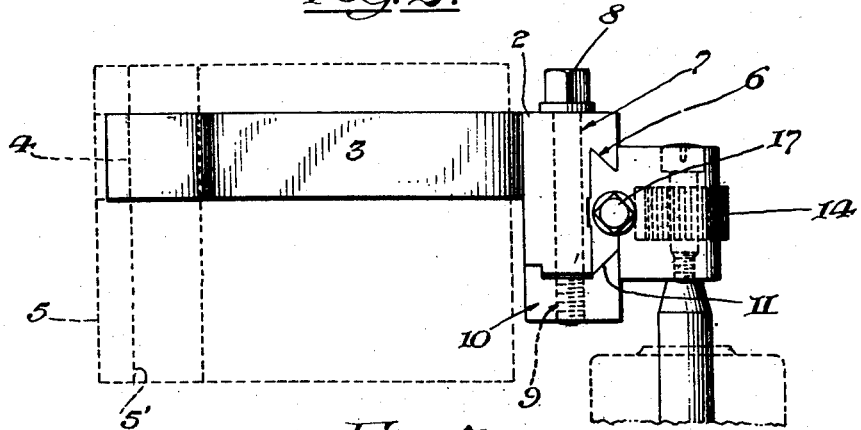
Fig. 2 is a view taken at right angles to Fig. 1.
Figure 3:
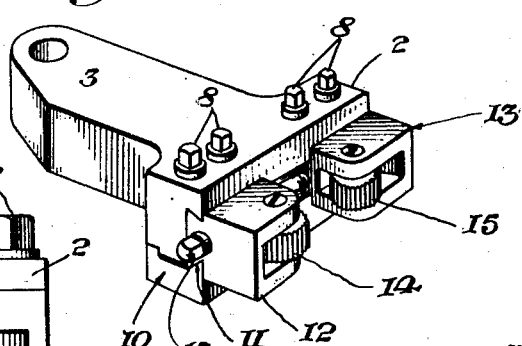
Fig. 3 is a perspective view of the improved tool holder removed from its holding bracket.
Figure 4:
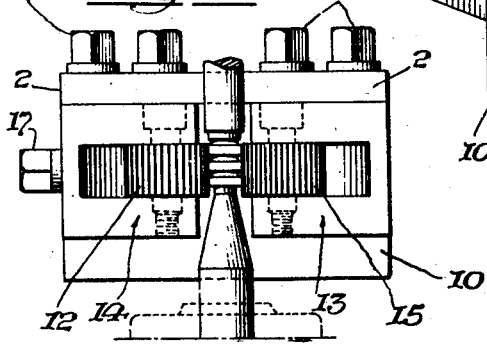
Fig. 4 is an end view of this improved tool holder illustrating a work piece in operating position between the tools.

Before explaining in detail the present improvement and its mode of operation, I desire to have it understood that the invention is not limited to the details of construction and arrangement of parts illustrated in the accompanying drawings since the invention is capable of other embodiments, and that the phraseology employed is for the purpose of description and not of limitation.

This improved tool holder comprises a body or head portion 2 having a rearwardly extending shank 3 provided at one end thereof with a transversely extending hole 4. The shank is adapted to be held in a suitable bracket 5 and secured therein by means of a suitable pin or screw (not shown) extending through the opening 5' of the bracket and hole 4 of the shank 3.

The shank 3 is of such size that it will have a limited arcuate movement within the bracket 5 about its pivot point when secured therein so that when the tool holder is moved toward a work piece, or vice versa, this arcuate movement of the tool holder will permit the tools properly to center themselves relative to a work piece.

The body or head portion 2 of the holder is provided with a wedge-shaped slot 6 extending transversely of the hole 4 and is also provided with holes 7 for the reception of suitably formed or headed screws 8 which are adapted to pass through the body and to be threaded into openings 9 in a block 10.

This block 10 is provided with a tongue or lip 11 so formed that when the parts are assembled, they will form a dove-tailed slot and vise-like clamp for the reception of suitably shaped blocks 12 and 13 adapted to carry tools 14 and 15. One of the blocks, as 12, is provided with an opening for the reception of a suitably formed or headed screw 17 provided with a collar and this screw is adapted to be threaded into an opening 18 of the block 13 in such manner that rotation of the screw 17 causes the blocks 12 and 13 to move toward and from each other.

In the present instance, the tools 14 and 15 are shown provided with knurls for knurling a work piece but it will be readily understood that one block could be provided with a knurling tool and the other block carry a roller or the blocks could be provided with rotary shaving, burnishing, thread rolls or any other suitable rotary tools.

In the use of this improved tool holder, the screws 8 are loosened and the blocks 12 and 13 provided with suitable tools are inserted in the dove-tailed slot to the approximate desired position. The screws 8 at one end may then be partly tightened to secure one of the blocks, as 12, temporarily in position. The screw 17 may then be rotated to move the block 13 toward or from the block 12 any desired distance, accurately to finish a work piece in accordance with the diameter thereof.

Tightening of all the screws 8 will then clamp the tools in their adjusted positions and, thus, with this tool holder it is not necessary that the tools be accurately positioned relative to the work piece because when the tool holder is moved toward the work, the pivoted action of the holder about its pin in the bracket 5 will permit it to center itself relative to the work and when it is desired to perform other operations upon a work piece, this same tool holder may be used by merely changing the tools and turning the body 2 in the holder 5 and the same holder can then be used on any of the side slide operations. Furthermore, in practice, the blocks and tools, as assembled may be interchanged for blocks carrying other tools, or the tools only may be changed in the blocks.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A device for holding self-centering operating tools on a machine, said device comprising, a first clamp member having a clamp portion defining a guide surface, a supporting shank fastened to said first clamp member and having means for pivotal connection to said machine, a second clamp member also having a clamp portion defining a guide surface facing the guide surface of the first clamp member, first tool holder means having a guide portion thereof slidable along said guide surfaces and clampable between said clamp portions, second tool holder means also having a guide portion thereof clampable between the clamp portions and slidable along the guide surfaces toward and away from the first tool holder means, adjusting means interconnecting both the tool holder means for adjustably sliding at least one of the tool holder means along said guide surfaces to position both tool holder means in a spaced position relative to each other along the guide surfaces, and lock means interconnecting the clamping members for drawing the clamp portions tightly against the guide portions of both tool holder means to lock said tool holder means in said spaced position on the guide surfaces.

2. A device for holding self-centering operating tools on a machine, said device comprising, a first clamp member having a clamp portion defining a guide surface, a supporting shank integrally connected to said first clamp member and having means for pivotal connection to said machine, a second clamp member also having a clamp portion defining a guide surface facing the guide surface of the first clamp member, first tool carrying block having a guide portion thereof slidable along said guide surfaces and clampable between said clamp portions, second tool carrying block also having a guide portion thereof clampable between the clamp portions and slidable along the guide surfaces toward and away from the first tool carrying block, adjustable bolt means interconnecting both the tool carrying blocks for adjustably sliding at least one of the tool carrying blocks along said guide surfaces to position both tool carrying blocks in a spaced position relative to each other along the guide surfaces, and bolt means interconnecting the clamping members for drawing the clamp portions tightly against the guide portions of both tool carrying blocks to lock said tool carrying blocks in said spaced position on the guide surfaces.

3. A device for holding self-centering operating tools on a machine, said device comprising, a first clamp member having a clamp portion defining a guide surface and having an alignment shoulder, a supporting shank integrally connected to, and extending transversely from, said first clamp member and having means for pivotal connection to said machine, a second clamp member also having a clamp portion defining a guide surface facing the guide surface of the first clamp member and having alignment means cooperating with the alignment shoulder of the first clamp member for aligning the clamp members, first tool holder means having a guide portion thereof slidable along said guide surfaces and clampable between said clamp portions, second tool holder means also having a guide portion thereof clampable between the clamp portions and slidable along the guide surfaces toward and away from the first tool holder means, adjusting means interconnecting both the tool holder means for adjustably sliding at least one of the tool holder means along said guide surfaces to position both tool holder means in a spaced position relative to each other along the guide surfaces, and lock means interconnecting the clamping members for drawing the clamp portions tightly against the guide portions of both tool holder means to lock said tool holder means in said spaced position on the guide surfaces.

J. E. MOSS.

REFERENCES CITED

The following references are of record in the file of this patent:

UNITED STATES PATENTS

| Number | Name | Date |
|---|---|---|
| 290,612 | Tucker | Dec. 18, 1883 |
| 632,358 | Miller | Sept. 5, 1899 |
| 637,320 | Billings | Nov. 21, 1899 |
| 930,662 | Graham | Aug. 10, 1909 |
| 1,114,151 | Koontz | Oct. 20, 1914 |
| 1,116,005 | Babson | Nov. 3, 1914 |
| 1,528,672 | Leipert | Mar. 3, 1925 |
| 1,589,595 | Hitchcock | June 22, 1926 |

FOREIGN PATENTS

| Number | Country | Date |
|---|---|---|
| 241,827 | Great Britain | Oct. 29, 1925 |